United States Patent
Sasitornwannakul et al.

(10) Patent No.: US 7,394,633 B2
(45) Date of Patent: Jul. 1, 2008

(54) REVERSE CURRENT PROTECTION CIRCUIT FOR SWITCHING POWER SUPPLY

(75) Inventors: Alongkorn Sasitornwannakul, Samutprakarn (TH); Phichej Cheevanantachai, Samutprakarn (TH); Weng Leong Hon, Samutprakarn (TH)

(73) Assignees: Delta Electronics, Inc., Taoyuan Hsien (TW); Delta Electronics (Thailand) Public Company, Limited, Samutprakarn (TH)

( * ) Notice: Subject to any disclaimer, the term of this patent is extended or adjusted under 35 U.S.C. 154(b) by 441 days.

(21) Appl. No.: 11/124,929

(22) Filed: May 9, 2005

(65) Prior Publication Data
US 2006/0250737 A1    Nov. 9, 2006

(51) Int. Cl.
*H02H 3/00*    (2006.01)
(52) U.S. Cl. ........................................... 361/82
(58) Field of Classification Search .................. 361/82
See application file for complete search history.

(56) References Cited

U.S. PATENT DOCUMENTS 4,825,349 A * 4/1989 Marcel ........................ 363/50
6,229,291 B1 * 5/2001 Matsumura et al. ......... 323/282

* cited by examiner

Primary Examiner—Stephen W. Jackson

(57) ABSTRACT

A reverse current protection circuit is provided to protect the internal circuit components of a switching power supply from being damaged by a reverse current discharging from an input filtering capacitor. The reverse current protection circuit according to a preferred embodiment includes a transistor switch coupled between an input terminal and the input filtering capacitor. The reverse current protection circuit also includes a surveillance device for monitoring the change of a voltage polarity across the current-conducting terminals of the transistor switch and generating a driving signal if the voltage polarity across the current-conducting terminals of the transistor switch is changed. The reverse current protection circuit also includes a signal coupler for coupling the driving signal to the control terminal of the transistor switch in order to turn off the transistor switch so as to block the discharging loop of the reverse current.

14 Claims, 2 Drawing Sheets

REVERSE CURRENT PROTECTION CIRCUIT FOR SWITCHING POWER SUPPLY

FIELD OF THE INVENTION

The present invention is related to a reverse current protection circuit, and more particularly to a reverse current protection circuit capable of protecting the internal circuit components of a switching power supply from being damage as a result of a reverse current stemming from an input filtering capacitor when the input terminal of the switching power supply is short-circuited.

BACKGROUND OF THE INVENTION

FIG. 1 shows a typical representation of a switching power supply according to the prior art. The switching power supply 100 shown in FIG. 1 is made up of an input power source (typically a direct current (DC) voltage) 101, an electromagnetic interference filter (EMI filter) 102, an input filtering capacitor 103, a polarity detector 104, an inrush current limiter 105, a switch device 106, and a DC-DC converter 107. The electromagnetic interference filter 102 is coupled to the input power source 101 and is used for suppressing the differential mode noise or the common mode noise resulted from the circuit. The input filtering capacitor 103 is coupled to the input power source 101 and is used for smoothing the input DC voltage supplied from the input power source 101. The switch device 106, which is coupled to the input filtering capacitor 103 and is normally implemented by a cascaded switching transistor circuit, is used for alternately coupling the input DC voltage to the DC-DC converter 107. The DC-DC converter 107 is coupled to the switch device 106 and is used for converting the input DC voltage into one or more predetermined DC voltages to meet a set of specifications. The polarity detector 104 is used for detecting the change of the polarity of the input DC voltage and preventing the input DC voltage from being connected in reverse polarity. The inrush current limiter 105 is used for prohibiting the inrush current from proliferation.

In normal operation, the input filtering capacitor 103 is fully charged in order to remove the high-frequency harmonics of the input DC voltage. However, if the input terminal of the switching power supply is short-circuited, the input filtering capacitor 103 starts discharging its stored energy, and a large reverse current directing from the input filtering capacitor 103 to the input terminal of the switching power supply is circulating via the internal circuit components located in the proximity of the input terminal, for example, the electromagnetic interference filter 102, the polarity detector 104, the inrush current limiter 105, and the switch device 106. These internal circuit components would be vulnerable to the surging of the reverse current, and would be further burnt down if the discharging loop of the reverse current does not break off instantaneously.

Therefore, in case of the short circuit occurring to the input terminal, the energy stored in the input filtering capacitor is discharged to the input side of the switching power supply, and the internal circuit components would fail without the protection of a safeguard device.

There is a tendency to develop a reverse current protection circuit that can protect the internal circuit components of a switching power supply from damage as a result of a reverse current stemming from an input filtering capacitor when the input terminal is short-circuited.

SUMMARY OF THE INVENTION

An object of the present invention is to provide a reverse current protection circuit for protecting the internal circuit components of a switching power supply from being damaged by a reverse current discharged from an input filtering capacitor when the input terminal is short-circuited.

Another object of the present invention is to provide a switching power supply employing a reverse current protection circuit for protecting the internal circuit components from being damaged due to a short-circuited input terminal.

According to a prominent aspect of the present invention, a switching power supply is suggested and includes an input power source for supplying an input power, an electromagnetic interference filter for suppressing the differential mode noise or the common mode noise persisting in the circuit, an input filtering capacitor for smoothing the input power, a DC-DC converter for converting the input power into one or more predetermined voltage levels, a switch device for alternately coupling the input power to the DC-DC converter, and a reverse current protection circuit for protecting the internal circuit components from being damaged by a reverse current discharged from the input filtering capacitor. The reverse current protection circuit includes a transistor switch coupled to the input power source and having one control terminal and at least two current-conducting terminals, a surveillance device coupled to the transistor switch for monitoring the change of a voltage polarity across the current-conducting terminals and generating a driving signal in response to the change of the voltage polarity across the current-conducting terminals, and a signal coupler coupled between the transistor switch and the surveillance device for coupling the driving signal to the control terminal to turn off the transistor, and thereby blocking the discharging loop of the reverse current.

The foregoing and other features and advantages of the present invention will be best understood through the following descriptions with reference to the accompanying drawings, wherein:

DETAILED DESCRIPTION OF THE PREFERRED EMBODIMENT

Figure 2:
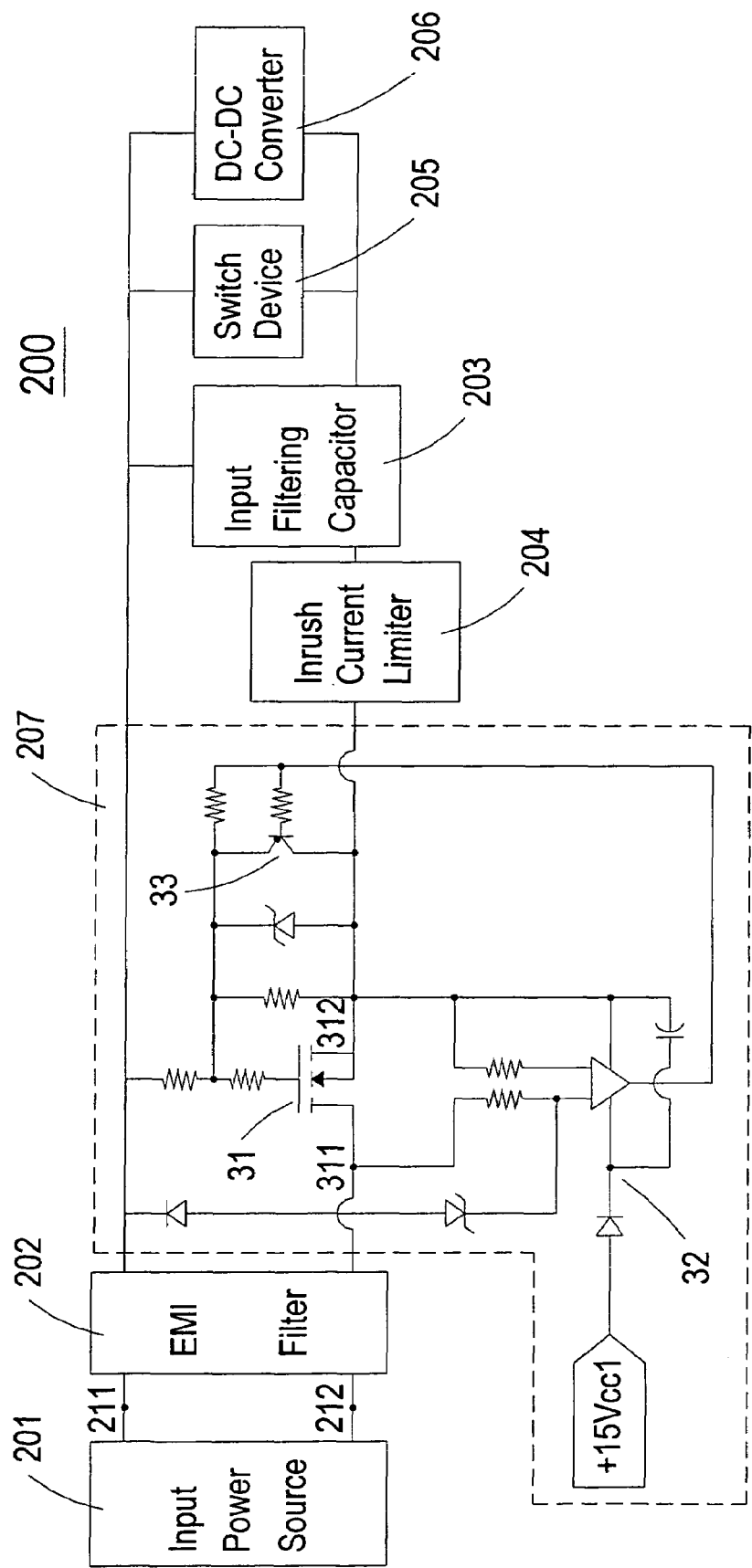
FIG. 2 is a circuit diagram showing a preferred embodiment of a switching power supply provided with a reverse current protection circuit according to the present invention.

Referring to FIG. 2, a circuit diagram showing a switching power supply provided with a reverse current protection circuit according to a preferred embodiment of the present invention is illustrated.

Figure 1:
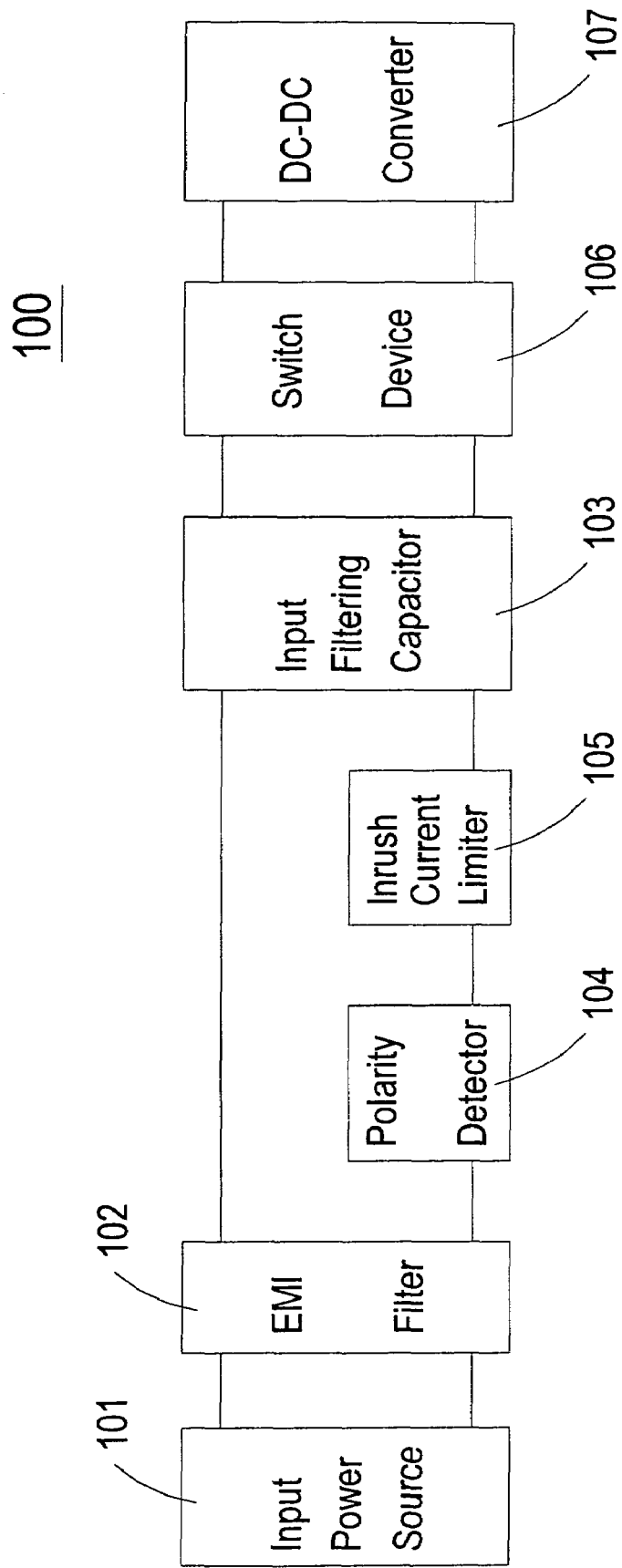
FIG. 1 is a circuit diagram showing a typical switching power supply according to the prior art.

As shown in FIG. 2, the switching power supply 200 includes an input power source (typically a direct current (DC) voltage) 201, an electromagnetic interference filter (EMI filter) 202, an input filtering capacitor 203, an inrush current limiter 204, a switch device 205, a DC-DC converter 206, and a reverse current protection circuit 207. The function and principle of the input power source 201, the electromagnetic interference filter 202, the input filtering capacitor 203, the inrush current limiter 204, the switch device 205, and the DC-DC converter 206 are similar to the function and principle of the conventional counterparts of FIG. 1, and their explanations are omitted herein.

It is noteworthy that the switching power supply 200 includes a reverse current protection circuit 207 located between the input power source 201 and the input filtering capacitor 203. The reverse current protection circuit 207 is principally made up of a transistor switch 31, a surveillance device 32, and a signal coupler 33. The transistor switch 31, which is typically implemented by a single N-channel MOSFET or a cascaded N-channel MOSFET circuit, is coupled to the input power source 201. The surveillance device 32 is coupled to the transistor switch 31 and is preferably implemented by a voltage comparator including an inverting input terminal coupled to a current-conducting terminal 311 of the transistor switch 31 and an non-inverting input terminal coupled to the other current-conducting terminal 312 of the transistor switch 31. The surveillance device 32 is used for monitoring the change of a voltage polarity across the current-conducting terminals 311, 312 of the transistor switch 31 and generating a driving signal in response to the change of the voltage polarity across the current-conducting terminals 311, 312. The signal coupler 33 is coupled between the transistor switch 31 and the surveillance device 32 and is preferably implemented by a PNP-type BJT transistor. The signal coupler 33 is used for coupling the driving signal outputted from the surveillance device 32 to the control terminal of the transistor switch 31 to control the on/off operation of the transistor switch 31. As for the function and principle of the reverse current protection circuit 207 in accordance with a preferred embodiment of the present invention, it will be described in detail below.

In normal operation, the input current is flowing from the positive input terminal 211 to the negative input terminal 212 of the input power source 201, and the transistor switch 31 is turned on and conducting current in the forward direction. That is, the current flows from the drain terminal 312 to the source terminal 311 of the transistor switch 31. In the meantime, the drain voltage of the transistor switch 31 is higher than the source voltage of the transistor switch 31, and the voltage comparator 32 outputs a HIGH signal to the PNP-type BJT transistor 33, which is then turned off. However, if the input terminal of the switching power supply 200 is short-circuited, the input filtering capacitor 203 starts discharging its stored energy by inducing a current flowing in a reverse direction with the input current. Thus, the transistor switch 31 is turned on and conducting current in a reverse direction, and the source voltage of the transistor switch 31 is higher than the drain voltage of the transistor switch 31. Thus, the voltage polarity across the current-conducting terminals of the transistor switch 31 is changed, and the voltage comparator 32 outputs a LOW signal as a driving signal to the PNP-type BJT transistor 33. The BJT transistor 33 is turned on accordingly, and thereby couples the driving signal (the LOW signal) to the gate terminal of the transistor switch 31. Therefore, the transistor switch 31 is driven by the Low signal and turned off instantaneously. As a result, the discharging loop of the reverse current stemming from the input filtering capacitor 203 is blocked by the turned-off transistor switch 31, and the internal circuit components of the switching power supply is shunned away from the damage caused by the surge of the reverse current.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A reverse current protection circuit for protecting internal circuit components of a switching power supply from a reverse current when an input terminal of the switching power supply is short-circuited, comprising:

a transistor switch coupled to the input terminal and having one control terminal and at least two current-conducting terminals;

a surveillance device coupled to the transistor switch for monitoring the change of a voltage polarity across the two current-conducting terminals and generating a driving signal in response to the change of the voltage polarity across the current-conducting terminals; and a signal coupler coupled between the transistor switch and the surveillance device for coupling the driving signal to the control terminal.

2. The reverse current protection circuit according to claim 1 wherein the transistor switch comprises a single N-channel MOSFET.

3. The reverse current protection circuit according to claim 1 wherein the transistor switch comprises a cascaded N-channel MOSFET circuit.

4. The reverse current protection circuit according to claim 1 wherein the surveillance device comprises a voltage comparator.

5. The reverse current protection circuit according to claim 1 wherein the signal coupler comprises a PNP-type BJT transistor.

6. A switching power supply comprising:

an input power source for supplying an input power;

an input filtering capacitor coupled to the input power source for smoothing the input power; and a reverse current protection circuit for protecting internal circuit components of the switching power supply from a reverse current discharging from the input filtering capacitor when an input terminal of the switching power supply is short-circuited, wherein said reverse current protection circuit comprises:

a transistor switch coupled to the input power source and having one control terminal and at least two current-conducting terminals:

a surveillance device coupled to the transistor switch for monitoring the change of a voltage polarity across the two current-conducting terminals and generating a driving signal in response to the change of the voltage polarity across the current-conducting terminals; and a signal coupler coupled between the transistor switch and the surveillance device for coupling the driving signal to the control terminal.

7. The switching power supply according to claim 6 wherein the input power source is a DC voltage.

8. The switching power supply according to claim 6 further comprising:

an electromagnetic interference filter coupled to the input power source for suppressing a differential mode noise or a common mode noise persisting in the switching power supply;

a power converter for converting the input power into at least one predetermined voltage level; and a switch device coupled to the power converter for alternately coupling the input power to the power converter.

9. The switching power supply according to claim 8 wherein the power converter is a DC-DC converter.

10. The switching power supply according to claim 6 wherein the transistor switch comprises a single N-channel MOSFET.

11. The switching power supply according to claim 6 wherein the transistor switch comprises a single N-channel MOSFET.

12. The switching power supply according to claim 6 wherein the transistor switch comprises a cascaded N-channel MOSFET circuit.

13. The switching power supply according to claim 6 wherein the surveillance device comprises a voltage comparator.

14. The switching power supply according to claim 6 wherein the signal coupler comprises a PNP-type BJT transistor.

* * * * *